No. 743,613. PATENTED NOV. 10, 1903.
G. A. BRONDER.
CONVEYER.
APPLICATION FILED MAR. 22, 1902.
NO MODEL. 2 SHEETS—SHEET 1.
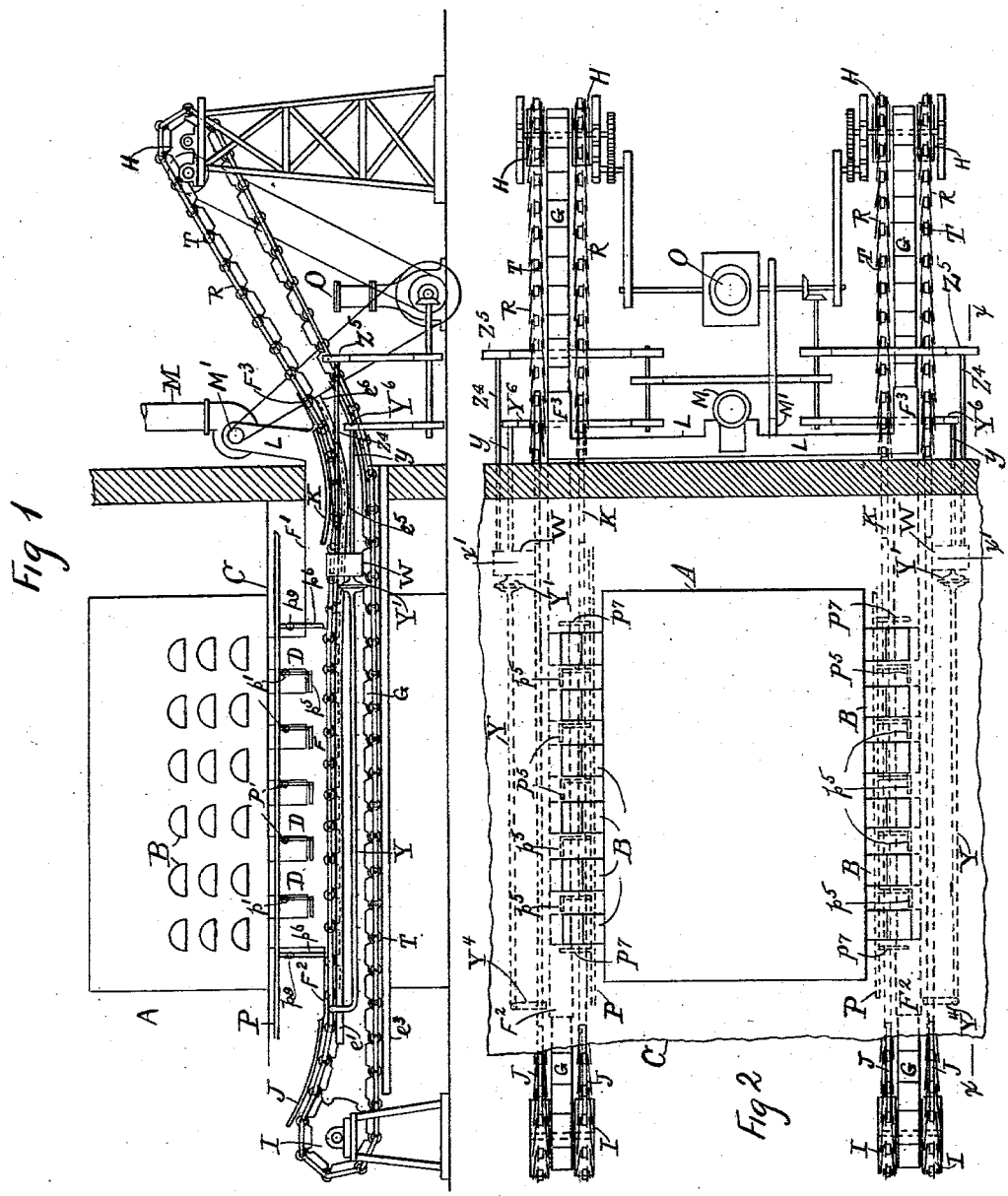
Witnesses
Thomas Grant
William P. Franel
Inventor
Gaston A. Bronder
By his Attorney No. 743,613. PATENTED NOV. 10, 1903.
G. A. BRONDER.
CONVEYER.
APPLICATION FILED MAR. 22, 1902.
NO MODEL. 2 SHEETS—SHEET 2.
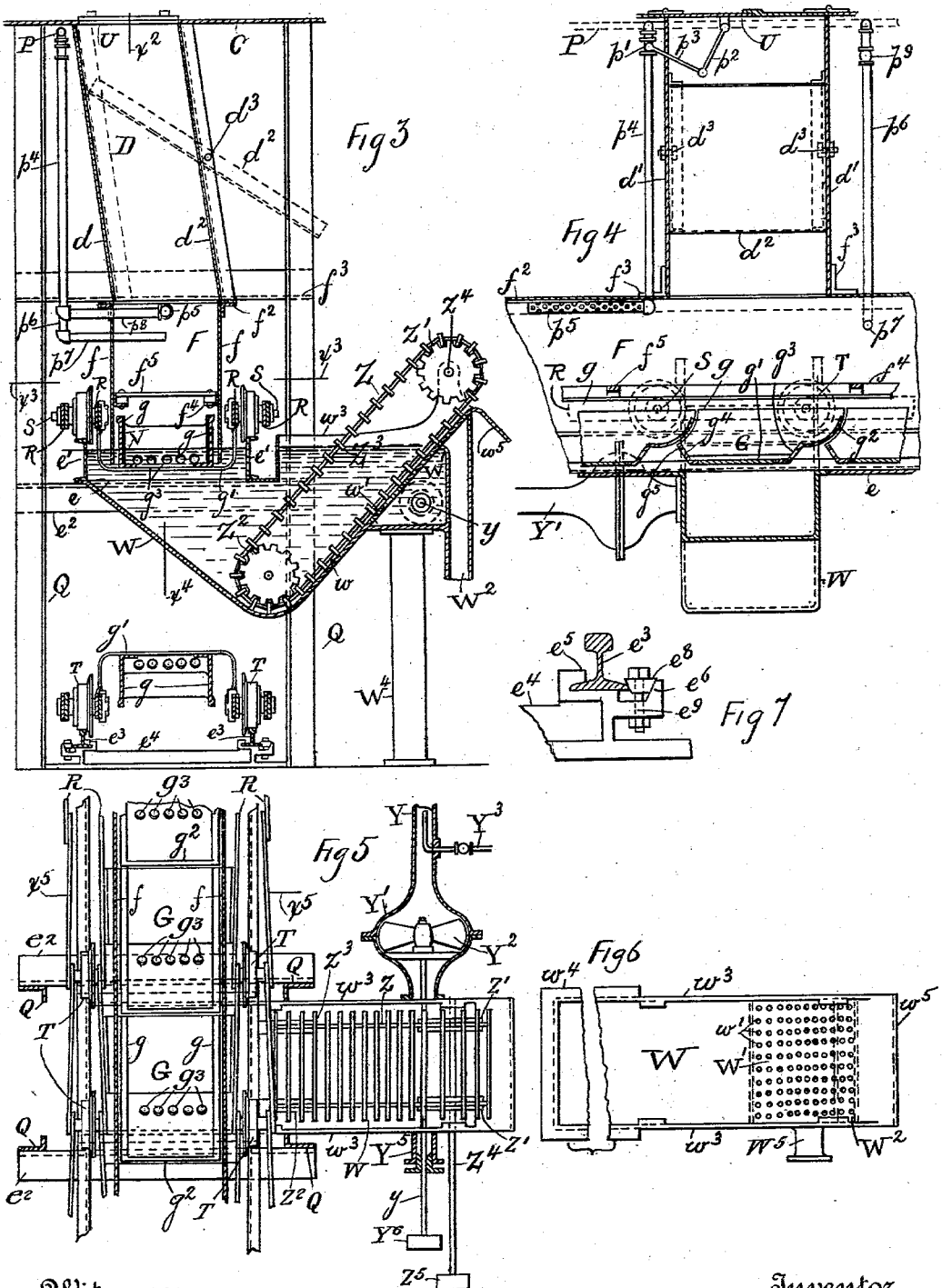
Witnesses
Thomas Grant
William P. Franel
Inventor
Gaston A. Bronder
By his Attorney
A. de Bonneville No. 743,613.

Patented November 10, 1903.

UNITED STATES PATENT OFFICE.

GASTON A. BRONDER, OF BROOKLYN, NEW YORK.

CONVEYER.

SPECIFICATION forming part of Letters Patent No. 743,613, dated November 10, 1903.

Application filed March 22, 1902. Serial No. 99,422. (No model.)

*To all whom it may concern:*

Be it known that I, GASTON A. BRONDER, a citizen of the United States, and a resident of the borough of Brooklyn, in the county of Kings and State of New York, have invented certain new and useful Improvements in Conveyers, of which the following is a specification.

This invention relates to conveyers that operate in water-sealed conduits. Its object is the production of conveyers operating in water-sealed conduits and the like, with appurtenances that will discharge the dust, smoke, or other gases which may be generated in said conduits and also any solid material, such as coke-breeze when used as a coke-conveyer, that may be spilled from the conveyer into the conduit, and means to maintain uniform water seals in the conduits.

In my patent application filed May 3, 1901, Serial No. 58,644, a conveyer operating in a water-sealed conduit is shown, described, and claimed, and the specific points of novelty in this invention are the means employed to discharge the solid material which may be spilled into the conduits and also the means by which the water seal is kept at a uniform level while operating the conveyers through the said conduits.

Referring to the drawings, Figure 1 shows an elevation of my invention applied to a retort stack-house, with a section as on the line $x$ $x$ of Fig. 2. Fig. 2 is a plan of Fig. 1, with a horizontal section through the wall of the house. Fig. 3 shows a partial section, on an enlarged scale, on the line $x'$ $x'$ of Fig. 2. Fig. 4 represents a partial section of Fig. 3 on the lines $x^2$ and $x^4$. Fig. 5 is a section on the line $x^3$ $x^3$ of Fig. 3. Fig. 6 shows a plan view of a collecting-chamber. Fig. 7 represents an enlarged section of the lower runway-track and appurtenances as on the line $x^5$ $x^5$ of Fig. 5.

Referring to the drawings, a retort stack-house is shown at A with mouthpieces B. A floor C constitutes a platform extending beyond the walls of the stack-house, and chutes D, arranged below the level of said floor, lead to conduits consisting of the troughs $e'$ $e'$ below the top run of conveyers with buckets G and over which are supported the flues $F^2$ F $F^3$. The top surfaces of the said troughs $e'$ $e'$ constitute runway-tracks for the wheels T of the conveyers. The linked drive-chains R of the conveyers are driven by the sprocket drive-wheels H and turn over the idler-wheels I, the lower or secondary line of conveyers running on the runway-tracks $e^3$.

Guides J are placed near the idler-wheels I to lead the conveyers into the said conduits, and the guides K near the ends $e^6$ of the troughs and directly over depressions $e^5$ in the troughs deflect the conveyer-buckets below the level of the main horizontal runs of the said conveyers, thereby securing the effective submerging of the contents of the conveyers.

The flues $F^2$ F $F^3$ are connected with an exhaust blower or apparatus M by means of the piping L, the said flues extending at the ends to $F^2$ and $F^3$, so as to closely approach the bodies of the conveyers, and thereby preventing leakage.

Water-pipes P, having outlets $p^4$ $p^8$, with spray-heads $p^5$, and secondary outlets $p^6$ $p^7$, are secured under the floor C to direct streams of water into the conveyers and troughs.

At openings through the bottoms $e$ of the troughs $e'$ $e^6$ there are fastened the collecting-chambers W, and from the latter extend secondary chambers W', that lead to a third set of chambers Y', the latter incasing propellers $Y^2$. Piping Y extends from the chamber Y' to other portions of the trough, as at $Y^4$, constituting by-passes for the troughs of the conveyers, and the propellers may be employed to force the water through the said by-passes, or steam-injectors $Y^3$ may be used either alone or in conjunction with the propellers, particularly if the water in the piping becomes frozen.

Each propeller $Y^2$ is secured to a shaft $y$, turning in a stuffing-box $Y^5$, projecting from the chamber W'.

A secondary conveyer Z operates in the collecting-chamber W, and its blades $Z^3$ move on or in close proximity to an inner surface $w$ of the said chamber W. Perforations $w'$ lead to the secondary chamber W' and waste-channel $W^2$, from which latter extends an apron $w^5$. A pair of driving-wheels Z' and idlers $Z^2$ sustain and guide the said conveyer Z, which is propelled by means of the shaft $Z^4$. The sides $w^3$ of the collecting-chamber W are extended above the water-line V in the trough $e'$ $e^6$, and the latter consists of the bottom plate $e$, with the sides $e'$, on top of which the running-gear or wheels T of the conveyer run. The troughs are supported on angle-irons $e^2$, secured to hangers or stanchions Q, extending from and below the floor C. The collecting-chambers W are secured to the trough with flanges and are also carried by columns $W^4$.

At the lower portion of Fig. 3 there is shown a bucket in its inverted position on its runway-tracks $e^3$, supported on ties $e^4$ by forming in the ends of the said ties hooks $e^5$ and beveled ends $e^6$, the tracks being forced under the hooks by washers $e^8$, which bear against the flange of the track by means of bolts $e^9$. The flues consist of the side walls $f$, with covers $f^2$, secured to angles $f^3$, supported on the hangers or stanchions Q. The said side walls $f$ are extended to project between the sides $g$ of the buckets and the wheels or running-gear thereof. Angles $f^4$ are fastened to the sides $f$ to prevent material dropping between the sides $g$ of the conveyers and the sides $f$ of the flues. Cross-braces $f^5$ span the flues at intervals to scrape off and level any overcharge in the conveyers, thereby preventing the choking of the flues.

The chutes D comprise the fixed sides $d$ $d'$ and a movable or swinging side $d^2$, which latter can be tilted on pivots $d^3$, thereby forming a diverting-chute, as shown by the dotted lines in Fig. 3. By means of the movable sides the respective chutes D can be closed, and the coke can slide down the said tilted sides in the ordinary way, allowing repairs and adjustments to be made to the conveyers.

The conveyers consist of the buckets G, with sides $g$ and bottoms $g'$, which extend upwardly beyond the sides $g$ and are connected with the linked drive-chains R. In the fronts $g^2$ of the buckets are holes $g^3$, and in the rear ends there are formed perforations $g^4$. The linked drive-chains R carry axles S, on which the wheels T turn.

The piping under the floor C consists, essentially, of the main runs P, with spray-outlets $p^5$ and valves $p'$. Over the chutes D are hinged swinging covers U, from which extend the links $p^2$, that are connected to levers $p^3$, extending from the valves $p'$, by virtue of which the valves are actuated by the opening and closing of the covers. Secondary outlet-pipes $p^6$ $p^7$, with valves $p^9$, also extend from the main runs of piping P.

To use my invention and propel the conveyers and their appurtenances, an engine O, by belting or equivalent means, drives the wheels H of the linked drive-chains R and the respective pulleys $M'$ of the blower M, $Y^6$ of the propellers $Y^2$, and the pulleys $Z^5$ of the driving-wheels $Z'$ of the secondary conveyers Z. The covers U are opened to allow the hot coke or other material to be discharged from the mouthpieces B and fall into the buckets G of the conveyer, and with the same operation the valves $p'$ are opened, thereby quenching the charges and spraying the same as they pass under the water-outlets. The trough is previously filled with water to a level indicated by the line V, which is above the lower edges of the sides $f$ of the flues, thereby sealing the lower sides of the said flues and preventing any dust, smoke, or other gases from escaping excepting by way of the blower apparatus, which also creates a suction inwardly in the chutes D and prevents dust, smoke, gases, or vapor rising in the said chutes. Should the material be insufficiently sprayed by the perforated spray-pipes $p^5$, the secondary outlet-pipes $p^6$ $p^7$ are provided to thoroughly quench the same. The effect of the water is to precipitate any dust and allow it to be carried away by the conveyer, and the exhaust-blower apparatus carries away the gas and smoke. The holes $g^3$ $g^4$ in the buckets allow the water contained in the trough to enter said buckets.

When the conveyer, with its buckets G, is traveling in its flue and it is used for conveying and quenching coke, a quantity of breeze will be deposited on the bottom of the trough which will be carried to the collecting-chamber W, where it is taken by the conveyer Z and deposited on the outside over the apron $w^5$, and the perforations $w'$ in the side $w$ of the said chamber allow the water to run through the same, constituting a strainer, and the conveyer-blades operating over the said holes keep them clean. If the water-level rises, it runs into the waste-channel $W^2$. The propeller-wheel $Y^2$ or steam-injector $Y^3$ takes the water from the secondary chamber $W'$, connected with the collecting-chamber W, and by means of the pipe Y forces the water to the other end of the trough, as $Y^4$, and consequently maintains the water at a uniform height in the trough and flue, avoiding friction between the conveyer and the water by circulating the said water at the same speed as the conveyer. It will be noted that without means to return the water to the other end of the trough or flue the conveyer would soon drive all of the water out of the trough.

Having described my invention, I claim—

1. The combination of a conveyer, a liquid-sealed conduit between the body of the conveyer and its running-gear, means for propelling the conveyer in the conduit, and means for maintaining the water in the conduit at a uniform level when operating the conveyer.

2. The combination of a conveyer, a liquid-sealed conduit, the body of the conveyer operating in said conduit, means for collecting and expelling the material spilled into the conduit.

3. The combination of a conveyer, a trough below the conveyer, a flue extending around the body of the conveyer and between said body and the running-gear thereof, a collecting-chamber connected with the trough, piping connecting the said chamber with another portion of the trough.

4. The combination of a conveyer, a trough below the conveyer arranged to submerge only the body of the conveyer, a collecting-chamber connected with the trough, piping connecting the chamber with another portion of the trough, and means to take a fluid from the chamber and drive it through the piping and again into the trough.

5. The combination of a conveyer, a trough below the conveyer, the conveyer extending into the trough, a collecting-chamber connected with the trough, piping connecting the said chamber to another portion of the trough, a propeller-wheel forcing the water from the collecting-chamber through the piping and into the trough, and a steam-injector in the piping.

6. The combination of a conveyer, a trough below the conveyer, the conveyer extending into the trough, a collecting-chamber connected with the trough, a secondary chamber extending from the collecting-chamber, perforations between the chambers, piping extending from the secondary chamber to another portion of the trough, a third chamber in the piping, a propeller-wheel operating in the third chamber forcing the water from the secondary chamber to another portion of the trough.

7. The combination of a bucket-conveyer, a water-trough, means to submerge the buckets of the conveyer in the said trough, means to expel smoke and gases from the conveyer, a collecting-chamber connected with the trough, means to force a fluid from the said chamber to another portion of the trough, and means to propel the conveyer.

8. The combination of a conveyer, a trough below the conveyer, the body of conveyer extending into the trough, a collecting-chamber connected with the trough, piping connecting the said chamber with another portion of the trough, a secondary conveyer operating in the said chamber, holes in one of the sides of the chamber, the secondary conveyer operating over the said holes, a secondary chamber connected with the collecting-chamber by said holes, and a waste-channel connected to the collecting-chamber by means of said holes.

9. The combination of a conveyer, a trough, the body of the conveyer operating in the trough, a flue around the conveyer, running-gear of the conveyer operating outside of the trough and flue, a collecting-chamber connected with the trough, means to force the water from the collecting-chamber back into the trough, means to remove material collected in the chamber, and means to exhaust gases from the flue and trough.

10. The combination of a conveyer, runway-tracks for the conveyer, hooks incasing the runway-tracks, beveled washers securing the runway-tracks in position with the said hooks, and means to drive the conveyer.

11. The combination of a conveyer, a trough, the body of the conveyer operating in the trough, a flue covering the conveyer, running-gear of the conveyer outside of the trough and flue, chutes leading to the flue, a swinging side in each of said chutes forming a diverting-chute.

12. The combination of a conveyer, a trough to submerge the conveyer, a flue above the conveyer, water-outlets in the trough, means to control the said outlets, a collecting-chamber connected with the trough, means to drive water from the collecting-chamber and again into the trough, means to expel material spilled into the trough, and means to expel gases from the flue.

Signed at New York, in the county of New York and State of New York, this 7th day of March, A. D. 1902.

GASTON A. BRONDER.

Witnesses:
  CHAS. J. GEFVERT,
  A. J. LEWKOWICZ.